United States Patent [19]

Weis et al.

[11] Patent Number: 5,118,415

[45] Date of Patent: Jun. 2, 1992

[54] OXIDATION DITCH VELOCITY CONTROL SYSTEM

[75] Inventors: Frank G. Weis, Kansas City, Mo.; Lindy T. Cooper, Lawrence, Kans.

[73] Assignee: Smith & Loveless, Inc., Kans.

[21] Appl. No.: 739,862

[22] Filed: Aug. 2, 1991

[51] Int. Cl.⁵ .............................................. C02F 3/18
[52] U.S. Cl. ................................ 210/194; 210/219; 210/926
[58] Field of Search ............ 210/150, 194, 219, 629, 210/926

[56] References Cited

U.S. PATENT DOCUMENTS

| | | | |
|---|---|---|---|
| 3,579,439 | 5/1971 | Meiring et al. | 210/926 |
| 4,533,470 | 8/1985 | Gyulavári | 210/926 |
| 4,902,302 | 2/1990 | Reid | 210/926 |
| 4,975,197 | 12/1990 | Wittmann et al. | 210/926 |

FOREIGN PATENT DOCUMENTS 8301500 11/1984 Netherlands .
1129055 10/1968 United Kingdom .

Primary Examiner—Stanley S. Silverman
Assistant Examiner—Christopher Upton
Attorney, Agent, or Firm—Dressler, Goldsmith, Shore, Sutker & Milnamow, Ltd.

[57] ABSTRACT

An oxidation ditch for biological aerobic treatment of wastewater having a velocity control system to establish an increased and more uniform cross-sectional velocity throughout the flow channel. The system includes a turning baffle member positioned in at least one of the end sections of the flow channel. The turning baffle member is provided with an end portion that has an upper edge that extends under a brush aerator located across an elongated section of the flow channel. The upper edge of the other portion of the turning baffle member extends above the surface of the flowing mixed liquor stream. The flow of the mixed liquor downstream of the brush aerator is unrestricted by flow baffles located in the flow channel.

9 Claims, 2 Drawing Sheets

OXIDATION DITCH VELOCITY CONTROL SYSTEM

FIELD OF THE INVENTION

The present invention relates to oxidation ditches used for the biological aerobic treatment of wastewater such as sewage, industrial waste or the like. More specifically, the invention relates to a system to establish an increased and more uniform cross-sectional velocity throughout an oxidation ditch to cause efficient treatment and prevent solids deposition on the bottom of the oxidation ditch.

BACKGROUND OF THE INVENTION

Generally, the present invention is concerned with the treatment of wastewaters which contain biodegradable solids. Such wastewater may emanate from sewage collection systems, oil refineries, coke plants, paper making plants, canneries, food processing plants and the like. The treatment of these organic dissolved and suspended materials is typically accomplished by a process commonly classified as an aerobic treatment process. Removal of the organic material by this process is accomplished by two general mechanisms. First, impurities are adsorbed or absorbed at the interface between the associated biomass and the wastewater. Second, the biomass decomposes these organics through oxidation. The resulting increased biomass or sludge consisting of accumulated microorganisms is generally separated from the organically stabilized liquid. Most of the biomass is generally returned to the process to continue the process and the excess sludges are periodically removed from the system.

In conventional biological treatment systems, the major components are typically an aeration basin and a clarifier tank. The aeration tank may be rectangular or circular and contain means for continually circulating the mixed liquor (suspended solids and waste liquid) within the tank with the addition of oxygen or air to promote micro-organism growth. The aeration basin may also be generally oval in shape and define a trough-like channel having bottom and spaced upstanding side walls for retaining and circulating the mixed liquor in a continuous substantially closed flow path, which is often referred to as an "oxidation ditch". The mixed liquor is continuously circulated by means of rotating o brushes, discs, turbines or the like, at a flow velocity to maintain the solids in suspension. Additional air or oxygen may also be added to the circulating mixed liquor to promote micro-organism growth.

In the oxidation ditch system, a clarifier is required to separate suspended solids from the mixed liquor and to withdraw clarified liquid. The clarifier may be a separate unit located adjacent the oxidation ditch, and serves as a settling tank for separating suspended solids from the mixed liquor by gravity. The clarified liquid may be disposed of or reused, while the settled biomass remains in the clarifier, from which it may be disposed of as waste sludge, or recycled to the oxidation ditch to maintain the proper balance between organic loading and biological microbial mass solids in the mixed liquor. The separate clarifiers typically require pumping means to transmit mixed liquor from the oxidation ditch to the clarifier and/or pumping means to transmit the settled biomass from the clarifier back into the oxidation ditch.

In U.S. Pat. No. 4,614,589 a biological aerobic treatment system is disclosed that includes a streaming specific gravity separator located in the oxidation ditch. The separator separates and removes clear liquid from the mixed liquor flow path in a unique manner. U.S. Pat. No. 4,614,589 is assigned to the same assignee as the present invention.

U.S. Pat. Nos. 4,303,516, 4,383,922 and 4,446,018 also disclose oxidation ditches that include internal clarifier devices.

Oxidation ditches that include brush aerators to circulate the mixed liquor stream impart energy to mix and keep the contents of the mixed liquor stream flowing at the surface and a depth of not more than about fourteen inches. This energy is typically imparted most often in at least two locations in the elongated sections of the flow channel defined by the oxidation ditch adjacent the downstream ends of the end sections of the flow channel. This concentrated energy is extremely turbulent and must be changed into smooth, uniform flow to a depth of five feet to twelve feet. Current efforts to create more uniform velocities have resulted in uneven velocities throughout the flow channel. Most often the result has been a high surface velocity and a zero bottom velocity.

Present efforts to obtain uniform velocity have included the use of flow baffles and turning baffles located in the flow channel. Referring to FIG. 1, a schematic representation of an oxidation ditch 10 is shown that illustrates the prior art efforts to establish a more uniform flow velocity in the flow channel. Oxidation ditch 10 defines a flow channel 12 having a pair of end sections 14 and a pair of elongated sections 16 extending therebetween. A center wall 18 separates the sections 16. A brush aerator 20 extends across each of the elongated sections 16 a short distance downstream of each end section 14. The direction of flow in channel 12 is indicated by arrows. A flow baffle 22 is located across each section 16 downstream of each of the brush aerators 20. The flow baffles 22 are intended as a means to force more surface velocity to a greater depth. A turning baffle 24 is located in each of the end sections 14. Turning baffle 24 is spaced inwardly from the outer side wall defining the channel and extends from the bottom of the channel to an elevation above the surface of the flowing mixed liquor stream. The downstream or outlet edges of the baffles 24 terminate a short distance upstream of the aerators 20. The distance between the inlet and outlet edge of the baffles 24 and the inside and outside walls of the channel may be equal. Alternatively, it has been proposed to make the distance between the baffle and the outside wall at the inlet edge at one-third the width of the channel and the distance between the baffle and the outside wall at the outlet edge at one-half the width of the channel. The later arrangement causes the baffles to collect uneven quantities of the mixed liquor stream at the inlet end and results in directing more liquid to the inside of the brush aerator where the entering velocity is low.

Tests were conducted on an exemplary oxidation ditch of the type shown in FIG. 1 to determine velocity data at various locations in the flow channel downstream of the brush aerator. The locations were at four different depths at inside and outside portions of the channel. In a first test the oxidation ditch included two aerators 20, two turning baffles 24 and one flow baffle 22. In a second test the second flow baffle was included. The test data is shown in Table 1.

TABLE 1

| DEPTH | 1 FLOW AND 2 TURNING BAFFLES | | 2 FLOW AND 2 TURNING BAFFLES | |
|---|---|---|---|---|
| | VELOCITY INSIDE | VELOCITY OUTSIDE | VELOCITY INSIDE | VELOCITY OUTSIDE |
| 2' Down | 1.4'/sec. | 1.1'/sec. | 1.4'/sec. | 1.8'/sec. |
| 4' Down | 0.8'/sec. | 1.0'/sec. | 0.6'/sec. | 0.5'/sec. |
| 6' Down | 0.6'/sec. | 0.6'/sec. | 0.3'/sec. | 0.2'/sec. |
| 8' Bottom | 0.0'/sec. | 0.6'/sec. | 0.0'/sec. | 0.0'/sec. |
| | AVERAGE VELOCITY 0.8'/SEC. | | AVERAGE VELOCITY 0.6'/SEC. | |

Table 1 shows velocity downstream of the brush aerator measured at eight different points on a cross-sectional plane in the ditch. Table 1 also shows an average cross-sectional velocity.

As depicted in phantom lines in FIG. 1, the turning baffle 24 causes a vertical vortex at the downstream end thereof under the aerator 20 due to uneven velocity or energy leaving the baffle. The flow baffle 22 tends to create and reinforce the vortex. The flow baffle 22 also impedes the liquid flowing around the ditch in much the same manner as the positioning of a flat plate perpendicular to the flow would impede the flow.

There is a need for a better means to control the velocity of the flowing mixed liquor in an oxidation ditch in a manner that establishes a more uniform and increased cross-sectional velocity throughout the flow channel.

SUMMARY OF THE INVENTION

In accordance with the present invention an oxidation ditch is provided with velocity control means for establishing a more uniform cross-sectional velocity throughout the flow channel.

The velocity control means includes a turning baffle member positioned in at least one of the end sections of the flow channel that is spaced inwardly from the outside wall thereof. The turning baffle member is provided with an end portion that has an upper edge that extends under the brush aerator located across the elongated section of the flow channel immediately downstream of the end section. The upper edge of the other portion of the turning baffle member extends above the surface of the flowing mixed liquor stream. The lower edge of the turning baffle member contacts a bottom surface of the flow channel. The flow of the mixed liquor downstream of the brush aerator is unrestricted by flow baffles located in the flow channel.

Each end section of the flow channel may be provided with a plurality of concentric spaced apart turning baffle members. When more than one baffle member is provided, the ratio of the radii between adjacent baffle members is preferably in the range of from about 2.5 to about 3.5, most preferably about 3.0. The innermost baffle member preferably has a radius of from about 3.0 feet to about 5.0 feet.

Extension of the baffle member under the brush aerator prevents the formation of the above discussed vortex. The elimination of the flow baffles increases the average flow velocity through the flow channel.

Other features of the invention will become apparent from the detailed description which follows.

DESCRIPTION OF PREFERRED EMBODIMENT

Figure 1:
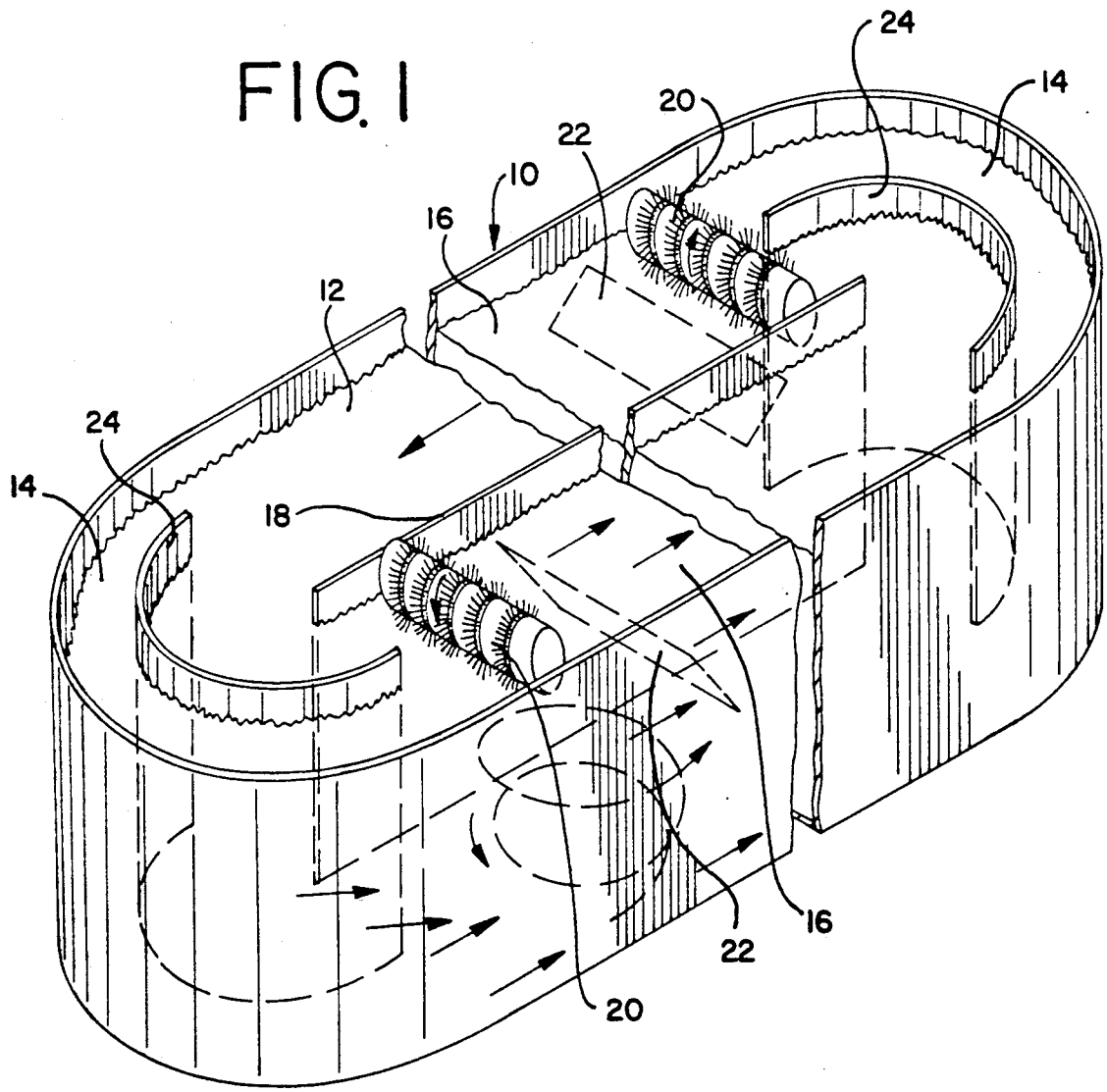
FIG. 1 is a schematic perspective view of an exemplary oxidation ditch containing a prior art velocity control system.
Figure 2:
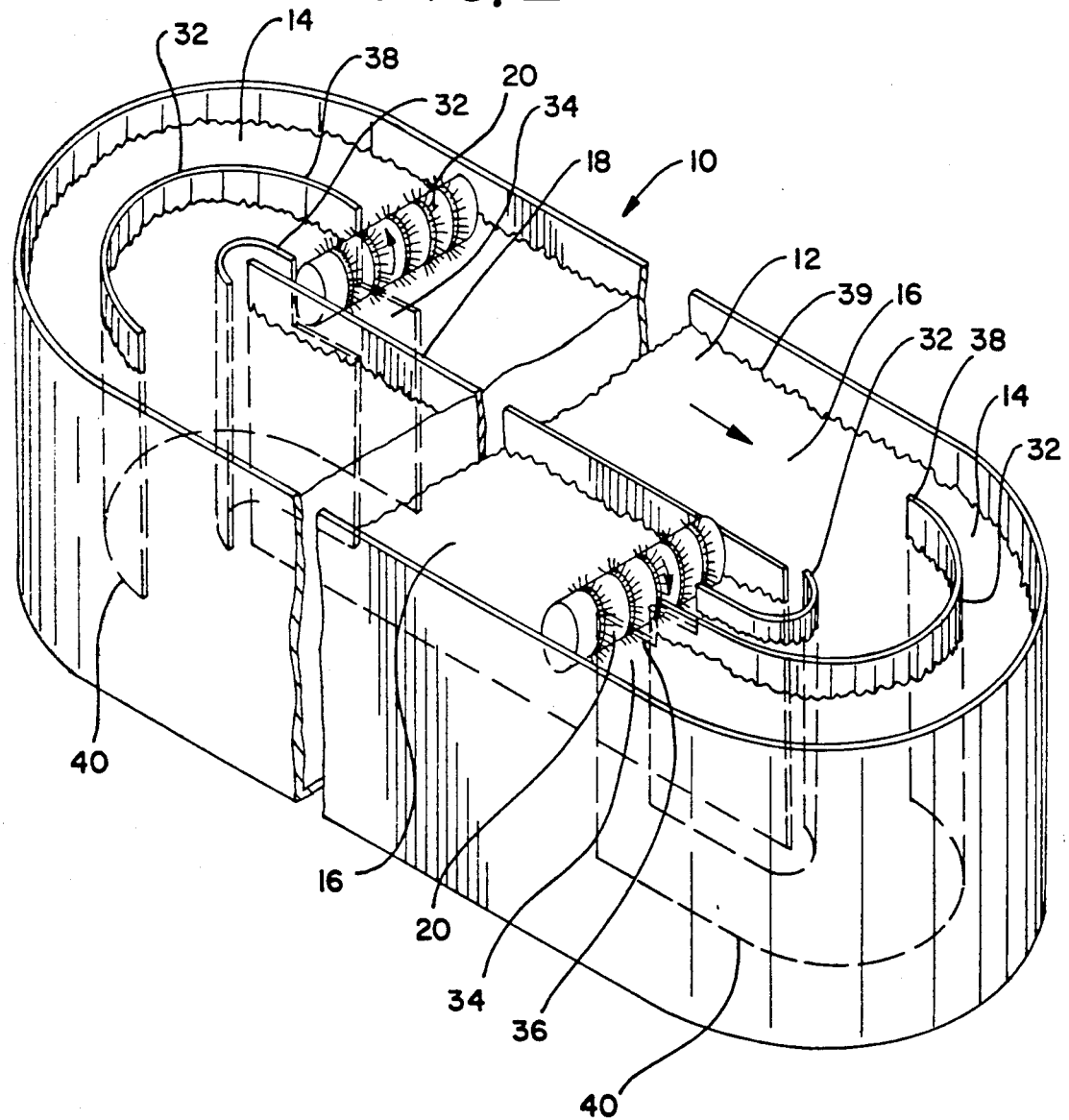
FIG. 2 is a schematic perspective view of an exemplary oxidation ditch containing a velocity control system in accordance with the present invention.

Referring to FIG. 2, an oxidation ditch 10 of the type shown in FIG. 1 is modified to incorporate a velocity control arrangement constructed in accordance with the present invention. The same or corresponding components or parts shown in FIGS. 1 and 2 are designated by the same reference numerals. The oxidation ditch 10 shown in FIG. 2 includes the same flow channel 12, end sections 14, elongated sections 16, center wall 18 and brush aerators 20 as discussed above with respect to FIG. 1.

In accordance with the present invention, oxidation ditch 10 is provided with a velocity control system for establishing a more uniform cross-sectional velocity throughout the flow channel 12. The velocity control system comprises a curved turning baffle member 32 positioned in at least one of the end sections 14 spaced inwardly from the outer side wall thereof. The outer end portion 34 adjacent the brush aerator 20 has an upper edge 36 that extends under aerator 20. The upper edge 38 of the other portion of baffle member 32 extends above the surface of the flowing mixed liquor stream in channel 12 indicated at 39. The lower edge 40 of baffle member 32 preferably contacts a bottom surface of the flow channel.

The direction of flow of mixed liquid liquor in channel 12 is indicated by an arrow in FIG. 2. The flow of mixed liquor in the channel 12 is not restricted by flow baffles located therein.

Each end section 14 may be provided with one or more turning baffle members 32. Referring to FIG. 2, each end section is provided with two concentrically spaced apart baffle members 32. When more than one baffle is provided, the ratio of the radii between adjacent baffle members is preferably in the range of from about 2.5 to about 3.5, most preferably about 3.0. The innermost baffle member 32 preferably has a radius of from about 3.0 feet to about 5.0 feet.

The extension of the baffle members 32 under the aerator 20 essentially prevents the above described vortex by carrying the velocities in each turning baffle section into the aerator.

Tests were conducted on an exemplary oxidation ditch of the type shown in FIG. 2, similar to those described above, to compare the effect of the change in the turning baffle configuration and the elimination of the flow baffles. In a first test the oxidation ditch included 2 aerators 20, 2 prior art turning baffles 24 of the type shown in FIG. 1, and one flow baffle 22 of the type shown in FIG. 1. In a second test the prior art baffles 24 were replaced with baffles 32 in accordance with the invention and the flow baffle 22 was eliminated. The test data is shown in Table 2.

TABLE 2

| DEPTH | 1 FLOW AND 2 TURNING BAFFLES | | 2 TURNING BAFFLES | |
|---|---|---|---|---|
| | VELOCITY INSIDE | VELOCITY OUTSIDE | VELOCITY INSIDE | VELOCITY OUTSIDE |
| 2' Down | 1.7'/sec. | 2.5'/sec. | 3.4'/sec. | 3.9'/sec. |
| 4' Down | 0.6'/sec. | 0.3'/sec. | 2.8'/sec. | 2.4'/sec. |
| 6' Down | 0.8'/sec. | 0.2'/sec. | 1.6'/sec. | 2.0'/sec. |
| 8' Bottom | 0.0'/sec. | 0.2'/sec. | 0.5'/sec. | 0.8'/sec. |
| | AVERAGE VELOCITY 0.8'/SEC. | | AVERAGE VELOCITY 2.2'/SEC. | |

Table 2 shows a more uniform cross-sectional velocity throughout the oxidation ditch and an increased average velocity in the flow channel in the embodiment utilizing the velocity control system in accordance with the invention. This assures uniform mixing of the resident bacteria in the flowing mixed liquor stream and results in more efficient treatment and prevents solids deposition on the bottom of the flow channel.

The oxidation ditch shown in FIG. 2 has a common wall 18 and an inner turning baffle member 32 is provided. Other oxidation ditch configurations have a center island which may preclude the requirement of the aforementioned innermost baffle member.

It will be readily observed from the foregoing detailed description of the invention and from the illustrated embodiments thereof that numerous variations and modifications may be effected without departing from the true spirit and scope of the novel concepts and principles of this invention.

What is claimed is:

1. In an oxidation ditch for biological aerobic treatment of wastewater wherein oxygen is induced into a flowing mixed liquor stream, said oxidation ditch having an inner wall and an outer wall defining a generally oval-shaped flow channel having generally curved end sections and elongated sections extending therebetween containing said mixed liquor stream, at least one brush aerator means extending across an elongated section of said flow channel in partially submerged contact with the mixed liquor stream, said flow channel having velocity control means for establishing a more uniform cross-sectional velocity throughout the flow channel; said velocity control means comprising:

a curved turning baffle member positioned in at least one of said end sections spaced inwardly from said outer wall, said turning baffle member having a first end portion that extends under said brush aerator means that is located across said elongated section downstream of said end section and a second end portion extending upstream of said first end portion.

2. The invention as defined in claim 1 wherein the upper edge of a portion of said turning baffle member extends above the surface of said mixed liquor stream.

3. The invention as defined in claim 1 wherein the lower edge of said turning baffle member contacts a bottom surface of said flow channel.

4. The invention as defined in claim 1 wherein a plurality of said baffle members are concentrically positioned in said end section.

5. The invention as defined in claim 4 wherein the ratio of the radii between adjacent baffle members is in range of from about 2.5 to about 3.5.

6. The invention as defined in claim 4 wherein the ratio of the radii between adjacent baffle members is approximately 3.0.

7. The invention as defined in claim 4 wherein the innermost baffle member has a radius of from about 3.0 feet to about 5.0 feet.

8. The invention as defined in claim 1 wherein the flow of mixed liquor downstream of said aerator means is substantially unrestricted by flow baffles located in said channel.

9. The invention as defined in claim 1 wherein a brush aerator means extends across each of said elongated sections and a curved turning baffle member is positioned in each of said end sections.

* * * * *